(12) United States Patent
Tanaka et al.

(10) Patent No.: US 9,186,580 B2
(45) Date of Patent: Nov. 17, 2015

(54) INFORMATION PROCESSING APPARATUS

(75) Inventors: Shinichi Tanaka, Kanagawa (JP); Daisuke Mori, Tokyo (JP); Keisuke Yamaguchi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 711 days.

(21) Appl. No.: 12/922,282

(22) PCT Filed: Jan. 22, 2009

(86) PCT No.: PCT/JP2009/000243
§ 371 (c)(1),
(2), (4) Date: Oct. 18, 2010

(87) PCT Pub. No.: WO2009/118973
PCT Pub. Date: Oct. 1, 2009

(65) Prior Publication Data
US 2011/0032250 A1    Feb. 10, 2011

(30) Foreign Application Priority Data

Mar. 24, 2008 (JP) ................................. 2008-076797

(51) Int. Cl.
*G06F 17/00* (2006.01)
*G06F 21/10* (2013.01)
(Continued)

(52) U.S. Cl.
CPC ............ *A63F 13/12* (2013.01); *A63F 2300/535* (2013.01); *A63F 2300/552* (2013.01); *G06F 17/00* (2013.01); *G06F 21/10* (2013.01)

(58) Field of Classification Search
CPC ..... G06T 15/005; G06T 19/00; G06T 11/001; G06T 11/40; G06T 11/60
See application file for complete search history.

(56) References Cited

U.S. PATENT DOCUMENTS 7,801,419 B2    9/2010 Sakai et al.
2003/0160823 A1    8/2003 Stannard
(Continued)

FOREIGN PATENT DOCUMENTS

JP    06342361 A    12/1994
JP    2004054502 A    2/2004
(Continued)

OTHER PUBLICATIONS

International Search Report for corresponding PCT application PCT/JP2009/000243, dated May 12, 2009.
(Continued)

*Primary Examiner* — Mark Zimmerman
*Assistant Examiner* — Michelle Chin
(74) *Attorney, Agent, or Firm* — Matthew B. Dernier, Esq.

(57) ABSTRACT

A storage stores content information for a trial version of an application program assigned identification information and content information for a product version; a license information acquisition unit acquires license information for the application program by referring to request information acknowledged by an input acknowledging unit; a determination unit determines whether the license information for the application program is stored in the memory by referring to the identification information; and a display processing unit generates a display screen using first content information until the determination unit determines that the license information is stored, and generates a display screen using second content information when the determination unit determines that the license information is stored.

12 Claims, 10 Drawing Sheets

(51) Int. Cl.
*A63F 13/12* (2006.01)
*A63F 13/30* (2014.01)

(56) References Cited

U.S. PATENT DOCUMENTS

| | | |
|---|---|---|
| 2005/0027657 A1* | 2/2005 | Leontiev et al. ............... 705/59 |
| 2005/0091168 A1 | 4/2005 | Gunyakti et al. |
| 2007/0160345 A1 | 7/2007 | Sakai et al. |
| 2009/0119780 A1* | 5/2009 | Ham ............................. 726/26 |

FOREIGN PATENT DOCUMENTS

| | | |
|---|---|---|
| JP | 2004341618 A | 12/2004 |
| JP | 2005129049 A | 5/2005 |
| JP | 2006323758 A | 11/2006 |
| JP | 2007259356 A | 10/2007 |
| WO | 2005109157 A1 | 11/2005 |

OTHER PUBLICATIONS

International Preliminary Report on Patenability and Written Opinion for corresponding PCT application PCT/JP2009/000243, dated Nov. 9, 2010.
Japanese Office Action for corresponding JP Application No. 2008-076797, dated Jan. 26, 2011.
Japanese Office Action for corresponding JP Application No. 2008-076797, dated Apr. 21, 2011.
Japanese Office Action for corresponding JP Application No. 2008-076797, dated May 29, 2012.
Japanese Office Action for corresponding JP Application No. 2008-076797, dated Jan. 10, 2012.

* cited by examiner

FIG.3

```
/GAME/ABCTENNIS/BOOT_GAME/
          PARAMETER.A
          CONTENT_INFO.B
          D00/PARAMETER_0.A
              CONTENT_INFO_0.B
          D01/PARAMETER_1.A
              CONTENT_INFO_1.B
          CONTENT_ID

/ABCGOLF/BOOT_GAME/
          PARAMETER.A
          CONTENT_INFO.B
          D00/PARAMETER_0.A
              CONTENT_INFO_0.B
          CONTENT_ID
```

FIG.4

| | |
|---|---|
| TITLE NAME | : ABC TENNIS |
| RENDERING RESOLUTION | : 480 |
| SOUND OUTPUT | : 2 |
| PARENTAL LOCK | : 12 |
| ⋮ | |
| GAME TYPE DESIGNATION INFORMATION | : ON |

PARAMETER.A

FIG.5

| |
|---|
| ICON.IMG |
| PIC0.IMG |
| PIC1.IMG |

CONTENT_INFO.B

FIG.6

| TITLE NAME | : | ABC TENNIS |
| RENDERING RESOLUTION | : | 1080 |
| SOUND OUTPUT | : | 7:1 |
| PARENTAL LOCK | : | 12 |
| ⋮ | | |
| GAME TYPE DESIGNATION INFORMATION | : | ON |

PARAMETER_0.A

FIG.7

ICON_0.IMG

PIC0_0.IMG

PIC1_0.IMG

CONTENT_INFO_0.B

INFORMATION PROCESSING APPARATUS

TECHNICAL FIELD

The present invention relates to an information processing technology executed in an information processing apparatus such as a game device.

BACKGROUND ART

A conventional menu screen proposed to improve operability of user interface includes a two-dimensional arrangement of a plurality of function icons and a plurality of media icons.
[patent document No. 1] WO2005-109157 pamphlet Manufacturers of games develop a variety of game software and attempt to introduce new games to users by distributing trial versions of software free of charge as well as advertising their products through TV commercials or the like. Many game devices recently available are designed to store game software in a large capacity storage such as a hard disk and allow users to enjoy the installed game without a game disk. These game devices also allow users to download game software from a virtual game shop on the Internet. Attempts are made to distribute trial versions of software from a virtual game shop and gain new users.

When a user likes the trial version of software, the user purchases the product version via the Internet and downloads the product. Therefore, the user has to download the software twice, i.e., the trial version and the product version. Various steps for purchase that should be gone through in a virtual game shop force users to experience hassle. As the trial version and the product version of game software are stored in the storage of the game device in a duplicate manner, the storage capacity is wastefully consumed. Since icons of executable game software are displayed in a menu screen of the game device, the icon of the trial version and that of the product version are both displayed, resulting in less user-friendly interface.

SUMMARY OF THE INVENTION

In this background, a purpose of the present invention is to provide a technology of effectively presenting the availability of application software to the user and reducing the hassle of running the application software for the user.

An information processing apparatus comprising: an input acknowledging unit configured to acknowledge request information from a user; a storage configured to store at least first content information and second content information for an application program assigned identification information; a display processing unit configured to read any of the content information for the application program and generate a display screen to display on an output device; a memory capable of storing license information; and a determination unit configured to determine whether the license information for the application program is stored in the memory by referring to the identification information. The display processing unit generates a display screen using the first content information until the determination unit determines that the license information is stored, and generates a display screen using the second content information when the determination unit determines that the license information is stored.

Optional combinations of the aforementioned constituting elements, and implementations of the invention in the form of methods, apparatuses, systems, recording mediums and computer programs may also be practiced as additional modes of the present invention.

BRIEF DESCRIPTION OF THE DRAWINGS

FIG. 3 shows the directory structure game software stored in a hard disk;
FIG. 4 show the content of parameter information (PARAMETER.A) for the trial version;
FIG. 5 shows the content of the content information (CONTENT_INFO.B) for the trial version;
FIG. 6 shows the content of the parameter information (PARAMETER_0.A) for the product version;
FIG. 7 shows the content of the content information (CONTENT_INFO_0.B) for the product version;
FIG. 9 shows a menu screen displayed on the display when the game device is turned on.

DESCRIPTION OF THE REFERENCE NUMERALS

1 ... game system, 10 ... game device, 12 ... output device, 18 ... provider server, 32 ... media drive, 34 ... hard disk drive, 40 ... game controller, 50 ... recording medium, 100 ... main controller, 110 input acknowledging unit, 112 ... communication control unit, 114 ... read/write control unit, 120 ... execution processing unit, 122 ... OS execution unit, 124 ... application execution unit, 130 ... acquisition unit, 132 ... program acquisition unit, 134 ... license information acquisition unit, 140 ... license information verification unit, 142 ... reference unit, 144 ... determination unit, 150 ... display processing unit, 152 ... background processing unit, 154 ... icon processing unit, 156 ... menu screen generation unit, 158 ... purchase screen generation unit, 160 ... game screen generation unit, 200 ... default background image, 205 ... selection area, 206 ... icon image, 208 ... icon of trial version of game, 210 ... background image of trial version of game, 212 ... menu list, 214 ... purchase button, 215 ... icon of product version of game, 218 ... background image of product version of game

DETAILED DESCRIPTION OF THE PREFERRED EMBODIMENTS

Figure 1:
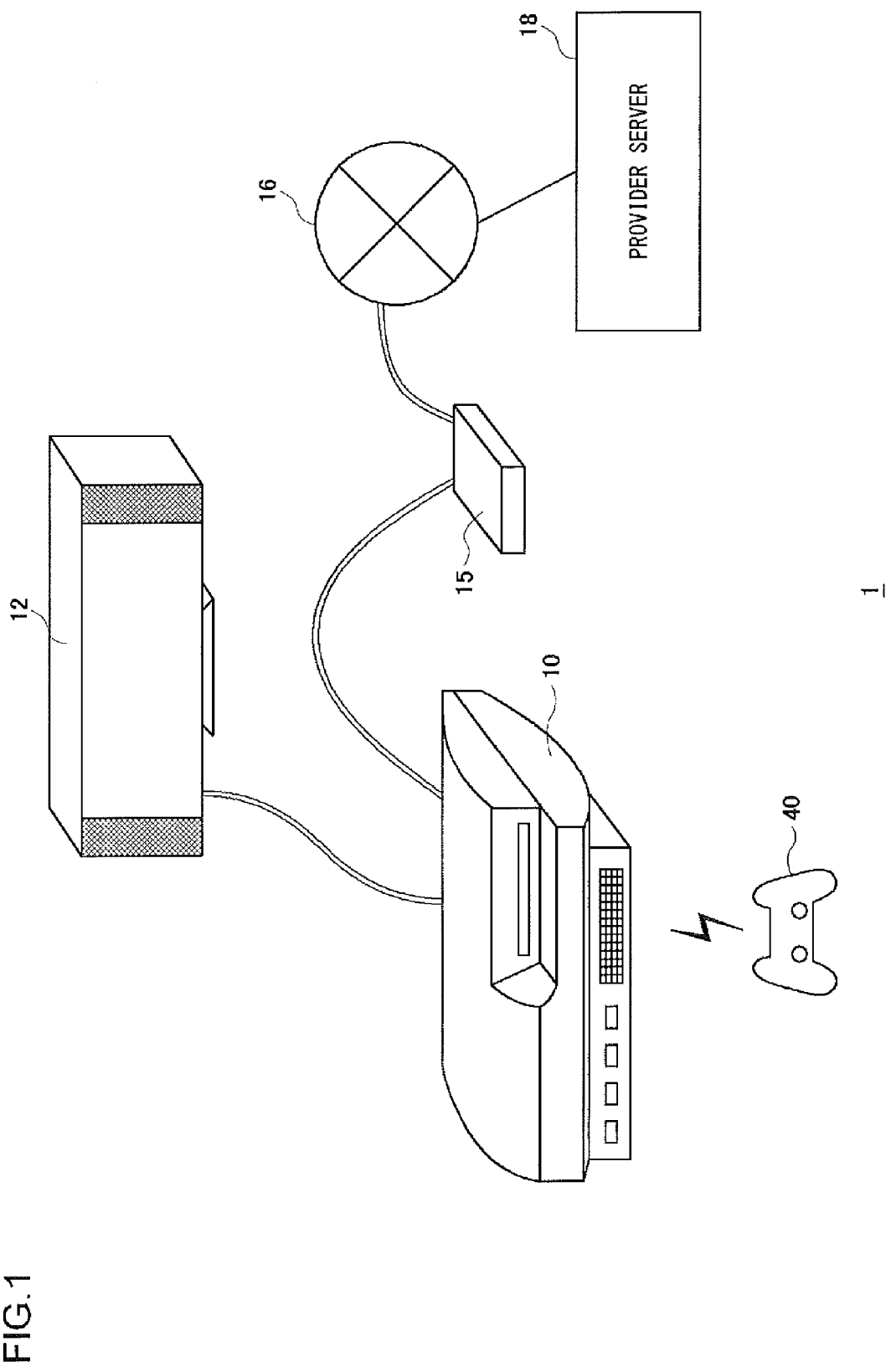
FIG. 1 shows a game system according to an embodiment of the present invention.

FIG. 1 shows a game system according to an embodiment of the present invention. A game system 1 comprises a game controller 40, a game device 10 configured to run a game program, and an output device 12 configured to output a result of processing by the game device 10. The game controller 40 is an input interface device that lets a user to enter a control input in the game device 10. The game controller 40 may transmit a control input wirelessly or may be connected to the game device 10 by a cable. The output device 12 may be a television set provided with a display for outputting an image and a speaker for outputting sound. The output device 12 may be connected to the game device 10 by a cable or wirelessly connected to the device using wireless local area network (wireless LAN). The game device 10 is connected to the a provider server 18 connected to a network 16 via a router 15 such that the device 10 can communicate with the server 18 and can transmit and receive desired data.

The provider server 18 is run by a game producer or a game vendor and provides the game device 10 with game software or license information related to the execution of game software.

The game device 10 of the game system 1 downloads a trial version of game software from the provider server 18 in accordance with a user direction provided via the game controller 40. Generally, a trial version of game software comes with certain restrictions of executable functions of the game program, unlike the product version. By way of example of restriction of the functions, the player can only play up to a certain stage or can only use limited characters.

According to the embodiment, the provider server 18 provides the game device 10 with a trial version of game software in which the function of the product version of game software is restricted, free of charge. The user can play the downloaded game software as a trial version. If the user likes the game, the user can access the provider server 18 to purchase the product version. In this process, the game device 10 may only have to pay for license information that permits expansion of the executable functions of the game program, instead of downloading the product version of game software. Once the license information is acquired, the game device 10 can remove the restriction of functions established in the game program to the extent permitted by the license information. The user can thus play the product version of game software.

Thus, the game system 1 is configured such that an extra step of downloading the product version is not necessary by allowing the product version of game software with restricted functionality to be downloaded as a trial version. In contrast to the related art, the inventive approaches removes the hassle of downloading the product version of game software and also prevents the wasteful step of storing the software of the same game in the game device 10 in a duplicated manner.

The technology disclosed in the embodiment can be implemented in information processing apparatus adapted to run other types of application programs as well as in the game device 10. The technology disclosed in the embodiment can not only be used in a trial version and a product version of software but also when functions of a product version are expanded in stages. In this case, too, the information processing apparatus initially downloads the application software that includes all of the functions of a product version. Each time license information is acquired from the provider server 18, the apparatus removes restriction on functions to the extent permitted by the license information and expands the functions accordingly. In this way, the information processing apparatus can upgrade application functions simply by acquiring license information. The hassle of downloading software repeatedly can be eliminated.

Figure 2:
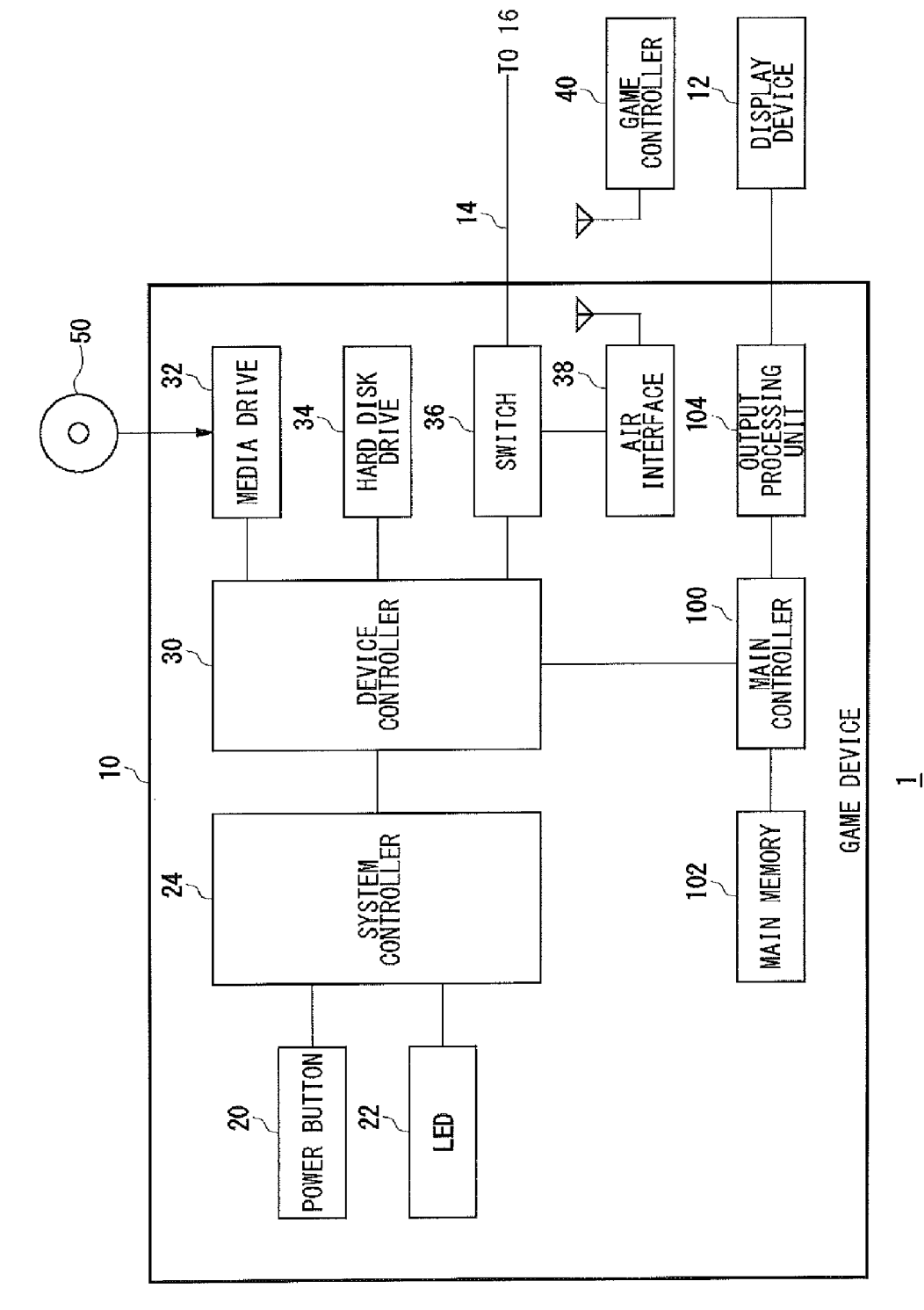
FIG. 2 is a functional block diagram of the game device.

FIG. 2 is a functional block diagram of the game device 10. The game device 10 comprises a power button 20, an LED 22, a system controller 24, a device controller 30, a media drive 32, a hard disk drive 34, a switch 36, an air interface 38, a main controller 100, a main memory 102, and an output processor 200.

The power button 20 is an input unit where a control input from the user is provided. The button is used to turn the game device 10 on or off. The power button 20 may be a down pressure button so that power may be turned on or off by pressing the button 20. Other structures, such as a touch sensor, that allow the user to turn the power on or off may be used to implement the power button 20. The LED 22 is turned on or off to indicate whether the power is turned on or off. The system controller 24 detects the pressed state or the non-pressed state of the power button 20. Upon detecting transition from the power-off state to the pressed state, the controller 24 activates the main controller 100, starts the boot sequence of the operating system, and turns the LED 22 on. When a power cable is connected to the game device 10, the system controller 24 maintains the standby mode even in the power-off state and monitors the depression of the power button 20.

Like a south bridge, the device controller 30 is configured as a large-scale integrated circuit (LSI) that supports delivery of information between devices. As illustrated, the system controller 24, the media drive 32, the hard disk drive 34, the switch 36, and the main controller 100 are connected to the device controller 30. The device controller 30 controls the timing of data transfer, canceling differences in electrical property of the devices or differences in data transfer rates thereof. The hard disk drive 34 drives a built-in hard disk so as to write and read data. The built-in hard disk functions as a storage for storing data. The media drive 32 is configured to drive and read a read-only recording medium 50 storing game software when the medium 50 is mounted and reads necessary data from the recording medium 50. The recording medium 50 may be a medium such as an optical disk and a magneto-optical disk.

The switch 36 is an Ethernet (registered trademark) switch and is a device connected wirelessly or by cable to an external device for transmission and reception of data. The switch 36 receives game software and license information from the provide server 18 via the network 16. The switch 36 is also connected to the air interface 38. The air interface 38 is connected to the game controller 40 provided with the function of communicating wirelessly using a communication protocol such as the Bluetooth protocol (registered trademark) or the IEEE802.11 protocol. User control information entered via the game controller 40 is provided to the main controller 100 via the air interface 38, the switch 36, and the device controller 30.

The main controller 100 is provided with a multicore CPU. One general-purpose processor core and a plurality of simple processor cores are provided in a single CPU. The general-purpose processor core is referred to as a power processing unit (PPU) and the processor cores are referred to as synergistic-processing units (SPU). The main controller 100 provides a function and an environment for using the game device efficiently. The main controller 100 runs the operating system (hereinafter, simply referred to as "OS") for controlling the entirety of the device. The OS layers of the game device 10 according to the embodiment comprises three layers, namely, the user layer, the kernel layer, and the hypervisor layer from top to bottom. Software for the user layer, kernel layer, and hypervisor layer is integrated and functions as the "OS" of the game device 10.

When power is turned on using the power button 20, the system controller 24 supplies power to the main controller 100 and the output processor 104 via the device controller 30. When power is supplied to the main controller 100, PPU first runs the boot loader of the OS and starts the hypervisor layer. Subsequently, PPU starts the kernel layer of the OS and then starts the user layer so as to be ready for data supplied from the hard disk drive 34 or the recording medium 50. This allows the main controller 100 to run the game program.

The main controller 100 is provided with a memory controller connected to the main memory 102. The PPU is provided with a register and a main processor as an entity of execution. The PPU itself may execute a task. The SPU is provided with a register, a subprocessor as an entity of execution, and a local memory as a local storage area. The main memory 102 and the local memory are configured using a random access memory (RAM). The SPU is provided with a dedicated direct memory access (DMA) controller as a control unit. By performing data transfer between the main memory 102 and the local memory, a stream of data can be processed at a high speed, and high-speed data transfer is achieved between a frame memory built in the output processing unit 104 and the local memory.

The output processing unit 104 is connected to the display device 12 and outputs a video signal and an audio signal resulting from executing the application. The output processing unit 104 is provided with a graphics processing unit (GPU) that implements image processing functions. High definition multimedia interface (HDMI) is employed in the GPU so that the GPU is capable of outputting the video signal in the digital format.

In addition to the function of reading the game software stored in the storage medium 50 into the main memory 102 or the local memory to run the software, the game device 10 according to the embodiment is also provided with the function of reading the game software installed in the hard disk of the hard disk drive 34 into the main memory 102 or the local memory to run the software. Hereinafter, games that are directly read from the storage medium 50 into the RAM for execution will be referred to as "disk-based games". Games that become executable by being installed in a storage such as a hard disk will be referred to as "installed games".

Game software includes an execution program that runs the game, game data used by the execution program, parameter information defining the setting information related to the execution of the game, and content information for the game.

The execution program is a program to progress the game. The game data includes data for stages deployed in the game, character data, etc. The parameter information is data that defines the operation of the game device 10, such as rendering resolution of the game, and information on age subject to restricted access by parental lock. The parameter information is read into the game device 10 before the execution program is started and is used for setting of the output resolution, determination on whether the execution program is permitted to be run under parent control, etc.

The parameter information also includes game type designation information indicating whether functions of the game are expandable. For example, a game with expandable functionality may be a game that can be converted from a trial version into a product version of the game. Alternatively, an expandable game may be a product version of the game in which functions can be upgraded or playable stages (fields) can be added. Whether expansion of functions of a game is permitted is determined by whether license information liked to the identification information of the game program is available. For this reason, the game device 10 refers to the game type identification information upon reading the parameter information. If it is found that functions of the game are expandable, the game device 10 verifies whether license information is stored in a predetermined memory area in the hard disk. When the license information is stored, the game device 10 runs functions permitted according to the license information.

The content information is data that includes icon images or explanatory notes of an application. The content information is used in the Menu screen of the game device 10 to let the user know the content of the game by displaying a game title using an icon or displaying an explanatory note. The content information may include a still image icon and/or moving image icon for display.

FIG. 3 shows the directory structure of game software stored in the hard disk. In the example shown in FIG. 3, two items of game software, ABCTENNIS and ABCGOLF are stored in the hard disk. The storage medium 50 also has the same directory structure. Normally, the recording medium stores only one item of game software but may store two items of game software as shown in FIG. 3. A description will now be given of directories below ABCTENNIS.

BOOT_GAME is a directory for storing the execution program of the game and the game data used by the program. On the same level as the BOOT_GAME directory are stored parameter information (PARAMETER.A) and content information (CONTENT_INFO.B) used in the trial version of the game.

PARAMETER.A may be the data file for the parameter information itself. Alternatively, PARAMETER.A may be information uniquely identifying the parameter information. For example, PARAMETER.A may be path information indicating the address in a storage area storing the parameter information. Alternatively, PARAMETER.A may be a file describing the path information for the parameter information, or information converted into the path information for the parameter information by a predetermined rule. Hereinafter, PARAMETER.A is assumed to be a parameter information file.

Similarly, CONTENT_INFO.B may be the content information itself. Alternatively, CONTENT_INFO.B may be information uniquely identifying the content information. For example, CONTENT_INFO.B may be path information indicating the address in a storage area storing the content information. Alternatively, CONTENT_INFO.B may be a file describing the path information for the content information, or information converted into the path information for the content information by a predetermined rule. Hereinafter, CONTENT_INFO.B is assumed to be a content information file itself. In this specification, CONTENT_INFO.B represents a set of a plurality of data files for convenience sake.

FIG. 4 show the content of parameter information (PARAMETER.A) for the trial version. PARAMETER.A may be a file of the XML format. The parameter information includes the title name, rendering resolution, sound output format, information on age defined by parental lock, etc. The information also includes game type designation information indicating whether functions of the game are expandable. If the game type designation information indicates "ON", it means that functions of the game are expandable. If the information indicates "OFF", it means that functions of the game cannot be expanded. If the parameter information does not include game type designation information, the game device 10 deals with the game software having such parameter information as not being expandable in terms of the functionality.

PARAMETER.A, which is used in the trial version, defines that the title name is ABC tennis, the rendering resolution is 480, the sound output format is 2ch, the age defined by parental lock is 12, and the game type designation information indicates ON. The title name included in the parameter information is used to indicate the title of the game software identified by an icon image in the menu screen and is displayed to the right of the icon image.

FIG. 5 shows the content of the content information (CONTENT_INFO.B) for the trial version. As mentioned above, CONTENT_INFO.B represents a set of a plurality of data files in this specification. More specifically, CONTENT_INFO.B represents three kinds of data files ICON.IMG, PIC0.IMG, and PIC1.IMG. ICON.IMG is a data file for the icon image of the trial version. PIC0.IMG is a data file for a background image. PICO.IMG is used as a background image when the icon image of the trial version of the game is located in a selection area in the menu screen displayed on the output device 12. PICO.IMG may be used as a background image when the icon image is located in the selection area and when a control input is provided by the user. PIC1.IMG is a data file for an explanatory image of the game. PIC1.IMG is displayed on the background image and used to show the game content.

Referring back to FIG. 3, D00 is a directory for storing parameter information and content information related to the product version of the game. In the case of game software in which the state of execution is changed in two stages, i.e., the trial version and the product version, only the D00 directory may be provided. In the case of game software in which the state of execution is changed in three or more stages, an additional directory such as the D01 directory may be provided in addition to the D00 directory. In the illustrated example, it is assumed that three stages of execution state are available so that the D01 directory is provided.

CONTENT_ID is identification information of the game program and uniquely identifies the game program. In the game system 1, identification information is assigned to all game programs. Game programs (game software) are identified using the identification information.

FIG. 6 shows the content of the parameter information (PARAMETER_0.A) for the product version. The data format and data item are identical to those of PARAMETER.A. PARAMETER_0.A, which is used in the product version, defines that the title name is ABC tennis, the rendering resolution is 1080, the sound output format is 7.1ch, the age defined by parental lock is 12, and the game type designation information indicates ON. As compared with the parameter information for the trial version shown in FIG. 4, the parameter information for the product version indicates that the rendering resolution and sound output format are enhanced. This allows the user to enjoy images and sound with a quality higher than the image quality or sound quality of the trial version. The file name of the parameter information for the product version may be identical to the file name of the parameter information for the trial version. For ease of understanding of the embodiment, different file names are used in the specification.

FIG. 7 shows the content of the content information (CONTENT_INFO_0.B) for the product version. Like the content information (CONTENT_INFO.B) for the trial version, the content information (CONTENT_INFO_0.B) for the product version also represents a set of a plurality of data files. ICON_O.IMG is a data file for the icon image of the product version of the game. PICO_O.IMG is a data file for a background image. PICO_O.IMG is used as a background image when the icon image of the product version of the game is located in a selection area in the menu screen displayed on the output device 12. PICO_O.IMG may be used as a background image when the icon image is located in the selection area and when a control input is provided by the user. PIC1_O.IMG is a data file for an explanatory image of the game. PIC1_O.IMG is displayed on the background image and used to show the game content. The file name of the content information for the product version may be identical to the file name of the content information for the trial version. For ease of understanding of the embodiment, different file names are used in the specification.

Figure 8:
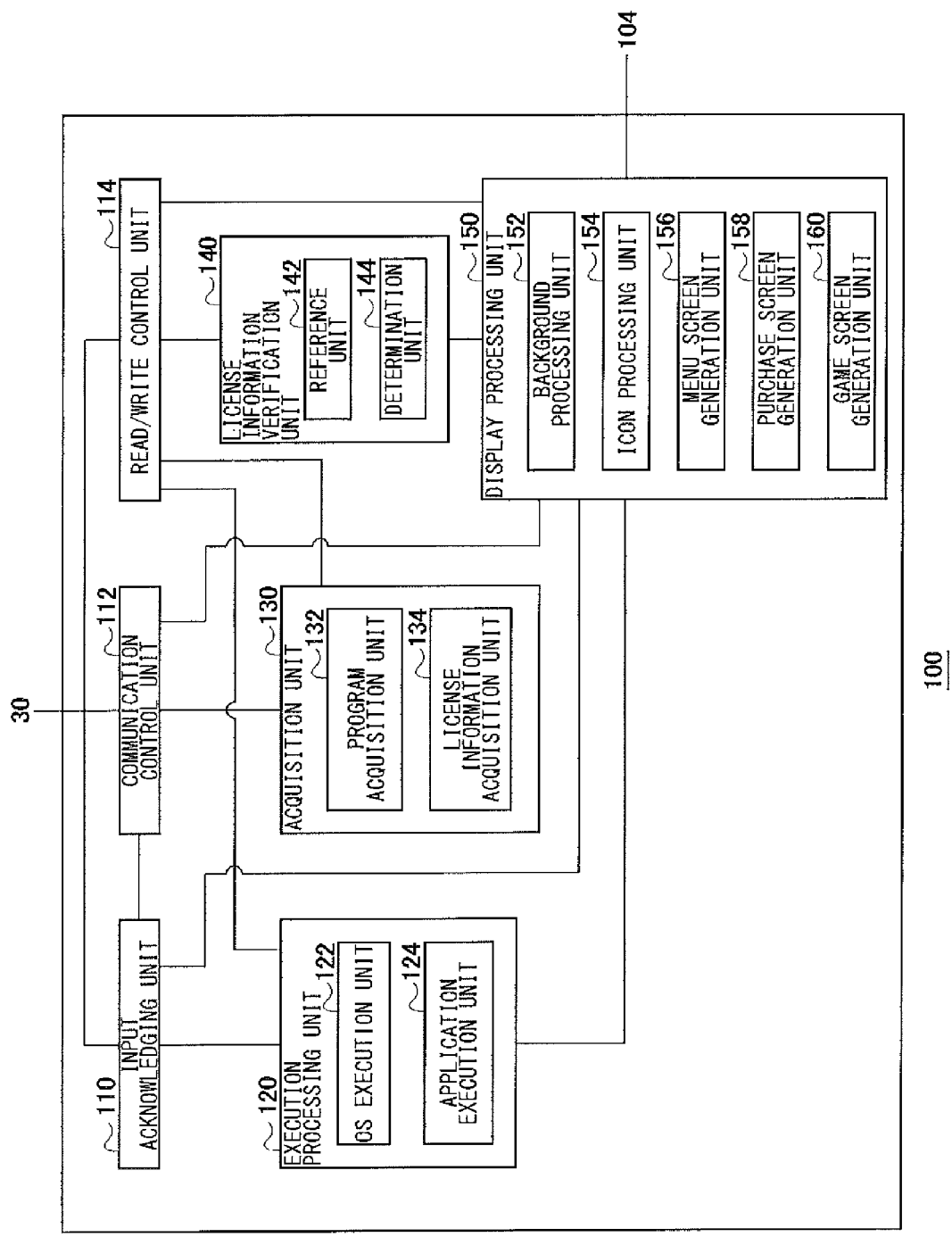
FIG. 8 shows the internal configuration of the main controller.

FIG. 8 shows the internal configuration of the main controller 100. The main controller 100 is provided with an input acknowledging unit 110, a communication control unit 112, a read/write control unit 114, an execution processing unit 120, an acquisition unit 130, a license information verification unit 140, and a display processing unit 150. The execution processing unit 120 is provided with an OS execution unit 122 and an application execution unit 124. The acquisition unit 130 is provided with a program acquisition unit 132 and a license information acquisition unit 134. The license information verification unit 140 is provided with a reference unit 142 and a determination unit 144. The display processing unit 150 is provided with a background processing unit 152, an icon processing unit 154, a menu screen generation unit 156, a purchase screen generation unit 158, and a game screen generation unit 160. The display processing unit 150 reads the content information for a game program using the read/write control unit 114 and generates a display screen for display on the output device 12.

The elements depicted in FIG. 8 as functional blocks for performing various processes are implemented in hardware such as a CPU, memory, or other LSI's, and in software such as a program, etc., loaded into the memory. As mentioned before, the main controller 100 is provided with a single PPU and a plurality of SPUs. The PPU and the SPUs can form functional blocks either alone or in combination. Therefore, it will be obvious to those skilled in the art that the functional blocks may be implemented in a variety of manners by hardware only, software only, or a combination of thereof.

The input acknowledging unit 110 acknowledges the user's control input entered in the game controller 40 via the device controller 30. In the game system 1, the user can use the game controller 40 to progress the game and can also enter information requesting the downloading of game software or acquisition of license information. When the game software is downloaded, the game device 10 accesses the provider server 18 and the output device 12 displays the graphical user interface (GUI) for downloading the game software. To facilitate the step of acquiring license information, the API (application program interface) of the OS displays a GUI for acquisition of license information on the output device 12. The user uses the game controller 40, viewing the screen of the output device 12.

When the input acknowledging unit 110 acknowledges information requesting the downloading of game software, the communication control unit 112 accesses the provider server 18 via the switch 36 and downloads the designated game software. The program acquisition unit 132 acquires the downloaded game software. As mentioned already, the game software is configured to include a game program, game data, parameter information, and content information. At least two kinds of parameter information are available. In this case, it is assumed that parameter information (PARAMETER.A) for the trial version and parameter information (PARAMETER_0.A) for the product version are included. Similarly, at least two kinds of content information are available, namely, content information (CONTENT_INFO.B) for the trial version and content information (CONTENT_INFO_0.B) for the product information. The downloaded game software is temporarily stored in the main memory 102 and stored in the hard disk by the read/write control unit 114. As the user requests the installation of the game, the game software can be executed by the game device 10. The hard disk stores the game program, game data, at least two kinds of parameter information, and content information, using the directory structure shown in FIG. 3. It will be assumed here that "ABC tennis game" is installed in the game software The license information verification unit 140 verifies whether the license information for the game software is stored in the hard disk. As already mentioned, license information permits expansion of executable functions of the game program. In this embodiment, if the license information is not stored in the hard disk, executable functions of the game program remain restricted and the game device 10 deals with the program as a trial version. More specifically, the reference unit 142 refers to the identification information of the game software and identifies a storage area in the hard disk that should store the license information, and refers to data stored in the storage area. The reference unit 142 acquires game type designation information included in the parameter information and performs the reference process when the designation information indicates "ON". The determination unit 144 receives the result of reference by the reference unit 142 and determines whether the license information for the game software is stored in the storage area. The determination unit 144 may determine whether the information stored in the storage area thus referred to is authentic information so that, if authentic, the determination unit 144 may determine that the license information is stored. The verifying process by the license information verification unit 140 is performed according to a predetermined timing schedule. As mentioned later, the verifying process by the license information verification unit 140 may be performed when the product version is purchased. The license information verification unit 140 generates a license information table describing whether the license information for the executable game program is available. The description below assumes that the trial version of the game software (ABC tennis game) is installed and the product version has not been purchased yet, i.e., the license information has not been acquired yet.

The menu screen generation unit 156 generates a menu screen based on the background image acquired by the background processing unit 152 and the icon image acquired by the icon processing unit 154. When the game device 10 is turned on, the background processing unit 152 reads the default background image present in the game device 10 from the hard disk driver 34 using the read/write control unit 114. The icon processing unit 154 reads a plurality of icon images identifying executable processes from the hard disk drive 34 using the read/write control unit 114. The icon processing unit 154 reads the icon of the game software from the hard disk drive 34 by referring to the license information table generated by the license information verification unit 140. The menu screen generation unit 156 generates a menu screen comprising a criss-cross vertical and horizontal arrangement of the plurality of icon images on the default background image provided by the background processing unit 152, and supplies the menu screen to the output processing unit 104.

Figure 9:
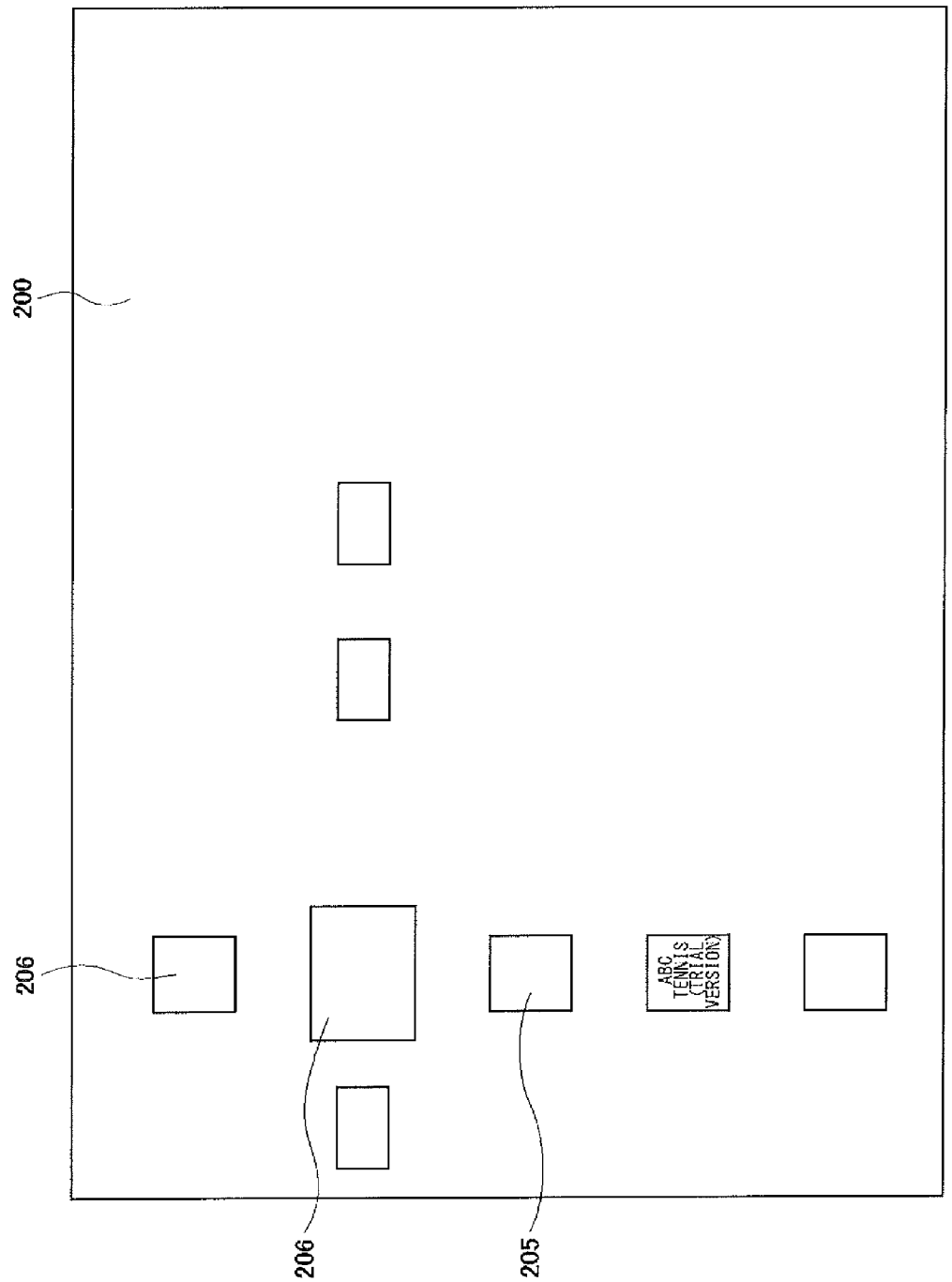

FIG. 9 shows a menu screen displayed on the display when the game device 10 is turned on. The menu screen shows a criss-cross arrangement of a plurality of icon images 206 on the default background image 200. By using the controller 40 to scroll and move a desired icon to the position of a selection area 205, the user can run the process associated with the icon.

Figure 10:
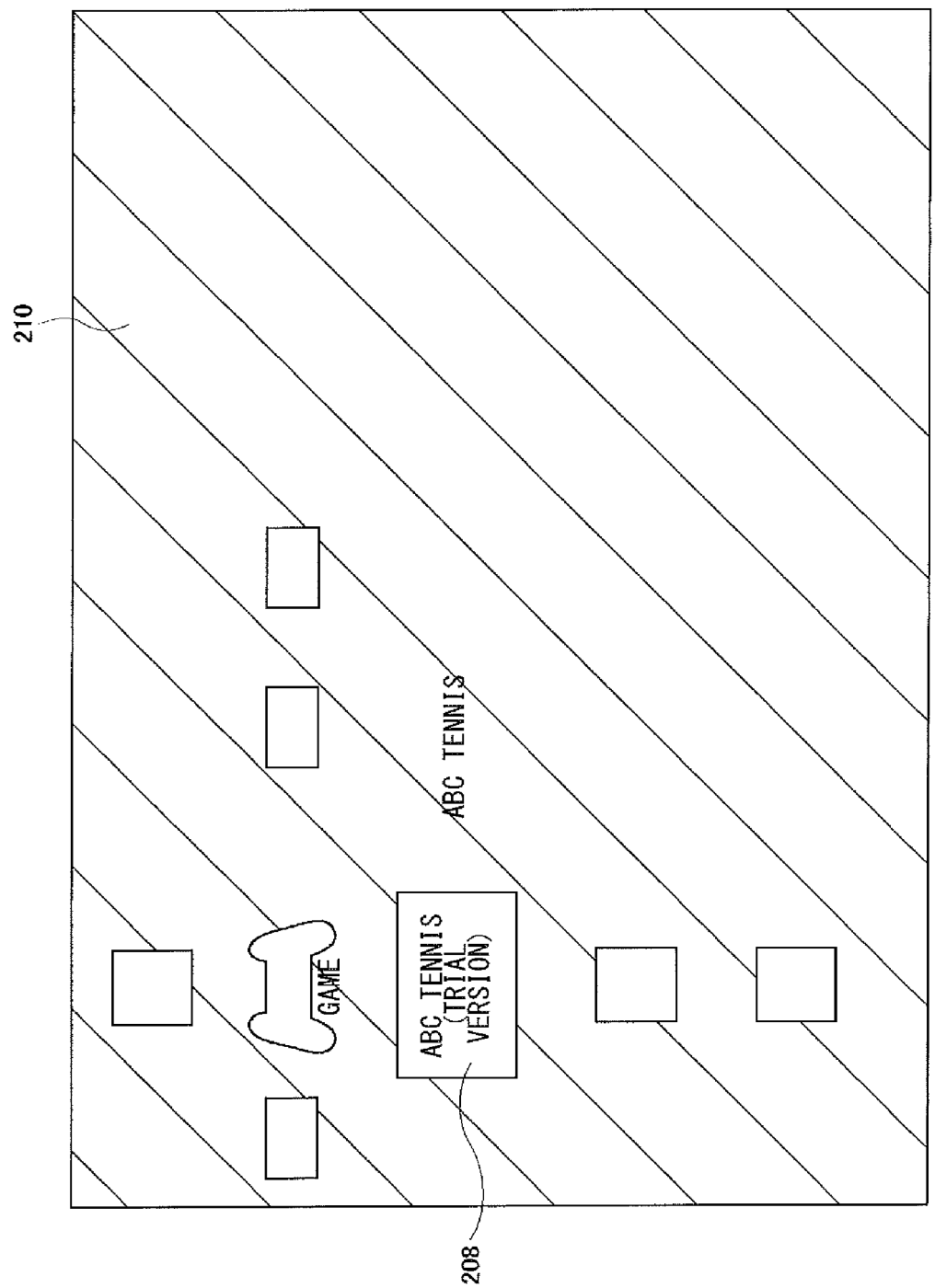
FIG. 10 shows a menu screen in which an icon of the trial version of the game is located in the selection area.

FIG. 10 shows a menu screen in which an icon 208 of the trial version of the game is located in the selection area. By locating the icon 208 of the trial version of the game in the selection area, the background processing unit 152 acquires a background image 210 of the trial version of the ABC tennis game using the read/write control unit 114, resulting in the menu screen as shown.

Since the license information for the ABC tennis game has not been acquired yet, the icon processing unit 154 acquires ICON.IMG from CONTENT_INFO.B shown in FIG. 5. As a result, the icon 208 of the trial version of the game is displayed as an icon of the ABC tennis game in the menu screen shown in FIGS. 9 and 10. When the icon 208 of the trial version of the game is located in the selection area, the background processing unit 152 acquires PICO.IMG from CONTENT_INFO.B. The menu screen generation unit 156 switches the background image from the default background image 200 to the background image 210 for the trial version of the game and generates the menu screen shown in FIG. 10. When the user uses a predefined button of the game controller 40 in this menu screen, the input acknowledging unit 110 acknowledges the control input and supplies the input to the menu screen generation unit 156. The menu screen generation unit 156 displays a menu list showing the contents of processes that can be performed for the trial version of the ABC tennis game.

Figure 11:
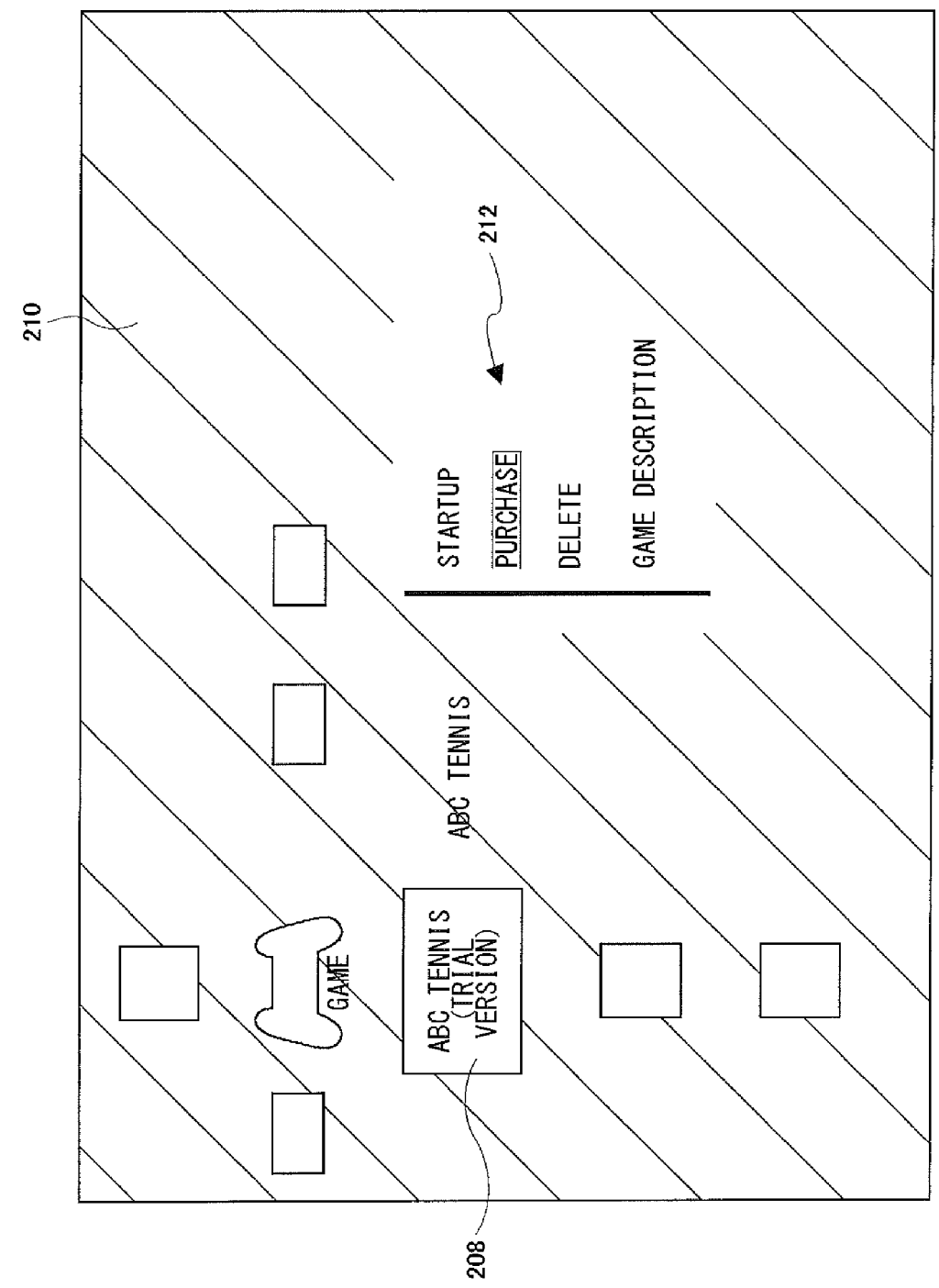
FIG. 11 shows a menu screen displaying a menu list.

FIG. 11 shows a menu screen displaying a menu list 212. The menu list 212 lists a "startup" item, "purchase" item, "delete" item, and "game description" item.

The "startup" item is used to request the starting of the trial version of the ABC tennis game.
When the "startup" item is selected, the execution processing unit 120 reads the game program of the trial version of the ABC tennis using the read/write control unit 114 and runs the game. The "delete" item is used to request the uninstalling of the trial version of the ABC tennis game. The "game description" item is used to display explanatory information on the ABC tennis game.

The "purchase" item is used to request the purchase of the product version of the ABC tennis game. In this embodiment, purchase of a game means acquisition of paid license information. When the user selects the "purchase" item, the input acknowledging unit 110 acknowledges a request for acquiring the license information for the ABC tennis game and the communication control unit 112 transmits the request for acquiring the license information of the ABC tennis game to the provider server 18 via the switch 36. The request for acquisition includes the identification information of the ABC tennis game.

Figure 12:
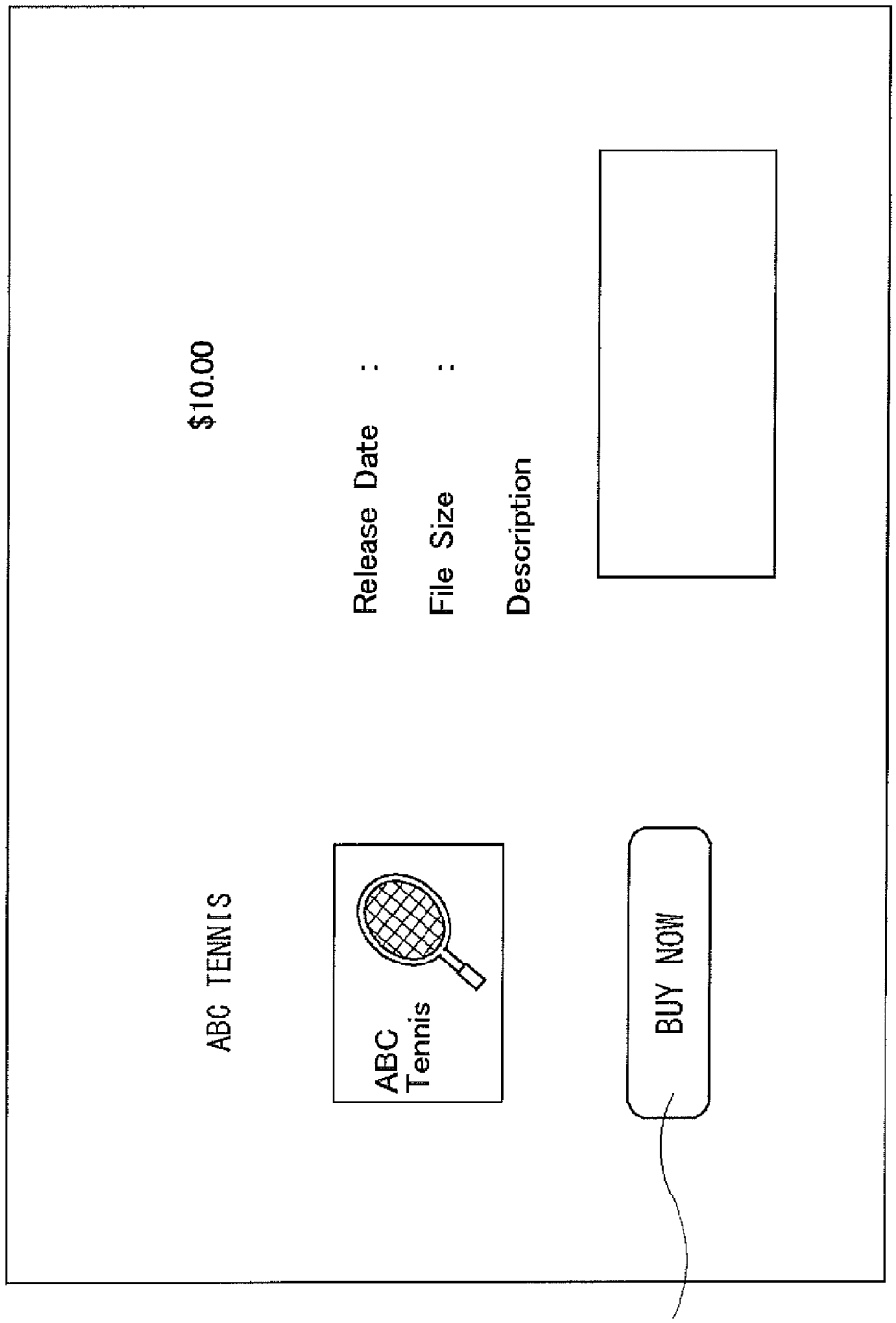
FIG. 12 shows a purchase screen of the game software.

FIG. 12 shows a purchase screen of the game software. Upon receipt of the request for acquiring the license information for the ABC tennis game, the provider server 18 generates configuration data for the game purchase screen based on the identification information of the ABC tennis game and transmits the data to the game device 10. The purchase screen generation unit 158 receives the configuration data for the game purchase screen and generates the purchase screen accordingly. When the user selects a purchase button 214 in the purchase screen, the input acknowledging unit 110 acknowledges the request for purchase. The communication control unit 112 transmits the purchase request including the identification information of the ABC tennis game to the provider server 18. In response, the provider server 18 bills the user and replies with the license information for the ABC tennis game. The communication control unit 112 supplies the received license information to the license information acquisition unit 134 so that the license information acquisition unit 134 acquires the information. The purchase screen shows File Size, which represents the file size of the product version for information purpose only. It should be noted that the data file for the product version is not downloaded in this embodiment.

When the license information for the ABC tennis game is acquired, the license information acquisition unit 134 generates a directory in the hard disk based on the identification information so as to store the license information. Hereinafter, the storage area in the hard disk that stores the license information will be referred to as a memory area. It is desirable that the algorithm for generating a directory in the memory area in the hard disk be not publicly known so that the data in the memory area cannot be altered.

In this way, the step of purchasing game software is quite simplified in the game system 1. When the user selects an item for purchase in the menu screen of FIG. 11, the display displays the purchase screen shown in FIG. 12. Therefore, the user can easily purchase the game software without taking complicated steps in a virtual game shop. Since the game software need not be downloaded, time required for communication with the provider server 18 is advantageously shortened.

Upon detecting that the process of purchasing software is performed, the license information verification unit 140 verifies whether the license information for the game software is stored in the memory area in the hard disk. When the process of purchasing the ABC tennis game is detected as being completed, the license information verification unit 140 verifies whether the license information for the ABC tennis game is stored in the memory area. Meanwhile, if it is not known that the process of purchase is completed but it is not known which software is purchased, software that has not been purchased yet is scrutinized to determine whether license information is available. More specifically, the reference unit 142 extracts the identification information of the game software not purchased yet from the license information table and, based on the identification information, identifies the memory area in the hard disk using the directory generating algorithm used in the license information acquisition unit 134. The reference unit 142 then refers to the data in the memory area. Upon receipt of the result of reference, the determination unit 144 determines whether the license information of the game software is stored in the memory area. In this embodiment, it is assumed that the determination unit 144 determines that the license information for the ABC tennis game is stored in the memory area and updates the license information table accordingly.

The determination unit 144 communicates the information on determination to the display processing unit 150. The determination unit 144 may notify the display processing unit 150 that the license information table is updated, and the display processing unit 150 may respond to this notification by referring to the license information table for verification. Alternatively, an update to the table may not be communicated to the display processing unit 150 so that the display processing unit 150 may refer to the license information table as needed when displaying the icon image 206. In any case, when the license information for the ABC tennis game is stored in the memory area, the icon processing unit 154 acquires ICON_O.IMG (icon of the product version of the game) from CONTENT_INFO_0.B shown in FIG. 7. The menu screen generation unit 156 generates a menu screen using the icon of the product version of the game instead of the icon 208 of the trial version of the game. When the icon of the product version of the game is located in the selection area, the background processing unit 152 acquires PICO_O-.IMG from CONTENT_INFO_0.B. The menu screen generation unit 156 generates a menu screen using the background image for the product version of the game instead of the background image 210 for the trial version of the game.

Figure 13:
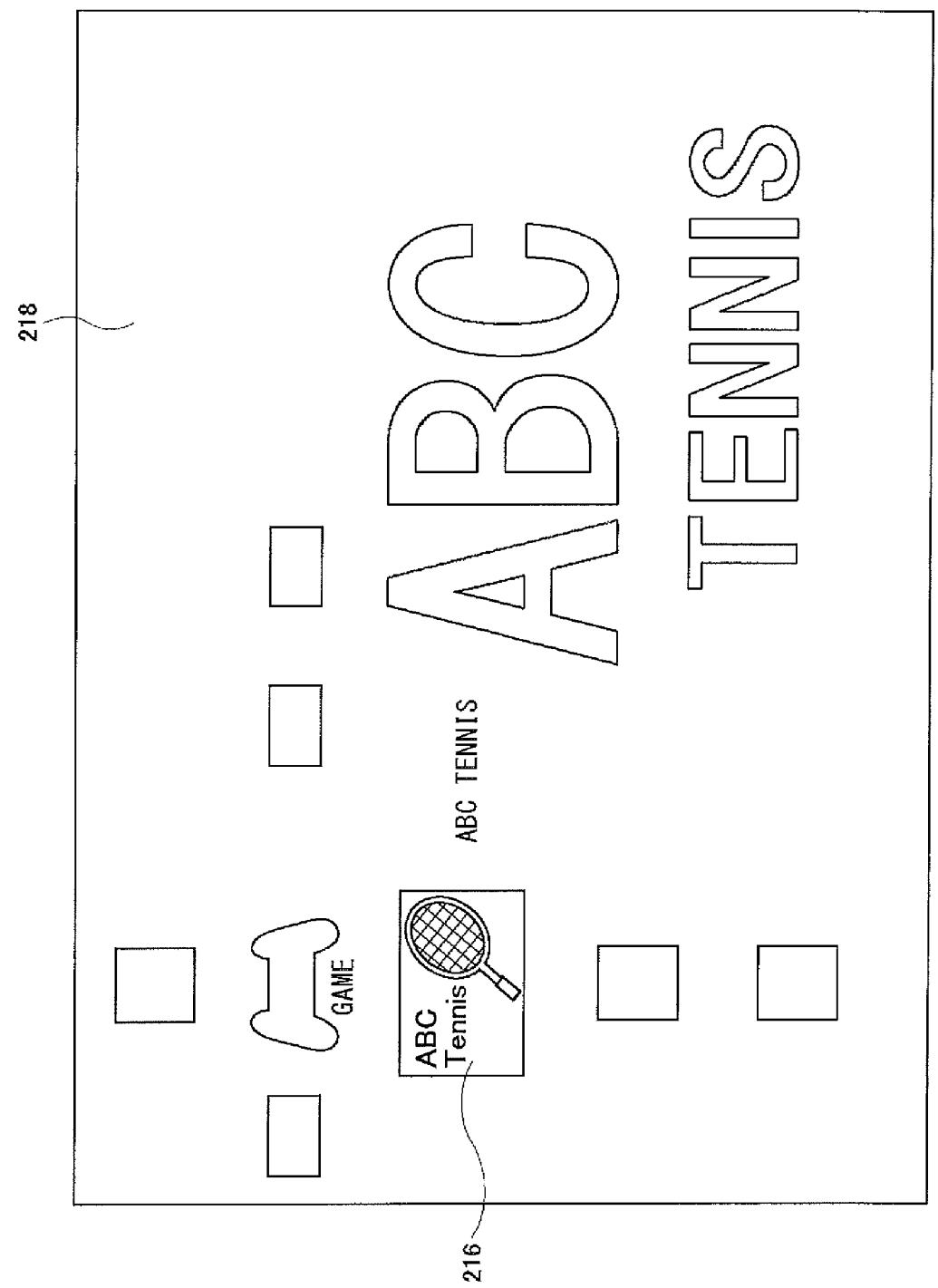
FIG. 13 shows a menu screen in which an icon of the product version of the game is displayed on a background image for the product version of the game.

FIG. 13 shows a menu screen in which an icon 216 of the product version of the game is displayed on a background image 218 for the product version of the game. In this embodiment, the display processing unit 150 uses CONTENT_INFO.B to generate a display screen until the determination unit 144 determines that the license information is stored. Once the determination unit 144 determines that the license information is stored, CONTENT_INFO_0.B is used to generate a display screen. These items of content information are not available in the game device 10 but are created by a game producer and represent the world view of the game. This helps maintain the user's high interest in the game software.

By switching the icon 208 of the trial version of the game to the icon 216 of the product version of the game after the license information is acquired, coexistence of two icons in the menu screen is avoided. This helps eliminated the chance of selecting the icon 208 of the trial version of the game after the product version is purchased, thereby achieving an environment in which the user can only select the icon 216 for the product version of the game once the product version is purchased.

The discussion above concerns the menu screen of an installed game. The same discussion applies to a disk-based game.

As explained with reference to FIG. 3, the read-only recording medium 50 is configured with substantially the same directory structure as shown in FIG. 3. The recording medium 50 includes an execution program, game data used by the execution program, parameter information defining configuration information related to the execution of the game, and game content information. The recording medium 50, when inserted into the media drive 32, is dealt with by the game device 10 as a storage including the game program, game data, at least two kinds of parameter information, and content information. The difference between a disk-based game and an installed game resides only in the place of storage of the game software. The menu screen is identically generated in both types of games.

A description will now be given of the execution of a game program. When the "startup" item is selected in the menu screen shown in FIG. 11, the application execution unit 124 starts the game program. In this process, the application execution unit requests the OS execution unit 122 to start the API processing module. The OS execution unit 122 responds to this request by starting the API processing module for the execution of games in the user layer of the OS.

In this embodiment, the API processing module determines whether the license information is stored in the memory area in the hard disk based on the identification information of the game software that is run. The function for determination is identical to the function of determination in the license information verification unit 140. The menu screen shown in FIG. 11 is the menu screen occurring before the license information for the ABC tennis game is acquired. Therefore, the memory area is not storing the license information when the game program is started from this menu screen. Thus, the API processing module determines that the license information is not stored and reads the parameter information (PARAMETER.A) based on the identification information of the game software, thereby configuring the rendering resolution, sound output format, etc. In this way, an environment for the execution of the trial version of the game is established.

After the game program is started, the application execution unit 124 inquires the API processing module about the state (mode) in which the game program should be executed, in accordance with a request from the game program. Responsive to the inquiry, the API processing module returns the license information to the application execution unit 124, if the information is available. Alternatively, the module may return information indicating that the license information is acquired. If the license information is not available, the module returns information indicating that the license information is not acquired to the application execution unit 124. The game program is provided with the function of determining the mode of execution upon reception of the value returned to the inquiry and operating in the mode thus determined. It will be assumed that the API processing module returns information indicating that the license information is not acquired to the application execution unit 124. In response, the game program determines that the program should be run as the trial version, imposing restrictions on executable functions. The application execution unit 124 runs the trial version of the game program with restricted functions and outputs processing results to the display processing unit 150 at the rendering resolution configured by the API processing module. The game screen generation unit 160 generates a game screen and supplies the screen to the output processing unit 104. The application execution unit 124 may output game sound to the output processing unit 104 in the sound output format configured by the API processing module. The API processing module may provide the output processing unit 104 with the rendering resolution and sound output format so that the output processing unit 104 processes the output from the application execution unit 124.

When the OS execution unit 122 starts the API processing module for the execution of games in reply to a request from the application execution unit 124 while the license information is stored in the memory area, the API processing module determines that the license information is stored in the memory area in the hard disk based on the identification information of the game software that is run. The API processing module reads the parameter information (PARAMETER_0.A) based on the identification information of the game software, thereby configuring the rendering resolution, sound output format, etc. In this way, the execution environment of the product version of the game is established.

After the game program is started, the application execution unit 124 inquires the API processing module about the mode of execution of the game program, in accordance with a request from the game program. In reply to the inquiry, the API processing module returns the license information or the information indicating that the license information is acquired to the application execution unit 124. In response, the game program determines that the program should be run as the product version. The application execution unit 124 runs the product version of the game program outputs the processing result to the display processing unit 150. The game screen generation unit 160 generates a game screen and supplies the screen to the output processing unit 104. Thus, advantageously, the game program need not have a complicated configuration by allowing the API processing module to determine whether the license information is available.

Described above is an explanation based on an exemplary embodiment. The embodiment is intended to be illustrative only and it will be obvious to those skilled in the art that various modifications to constituting elements and processes could be developed and that such modifications are also within the scope of the present invention. For example, it is assumed in the embodiment that an icon is selected by locating the icon in the selection area 205. Alternatively, a pointing device such as a mouse pointer may be used so that the user can select an icon. The icon processing unit 154 may refer to the age defined by parental lock and defined in the parameter information so as not to display an icon of the game software that users under the defined age cannot play.

The description of the embodiment assumes that the license information indicates a product version. Alternatively, the license information may indicate increase in executable functions in stages. Referring to FIG. 3, if the license information is not stored, PARAMETER.A and CONTENT_INFO.B are used. If the first license information is stored, PARAMETER_0.A and CONTENT_INFO_0.B in the D00 directory are used. If the second license information is stored, PARAMETER_1.A and CONTENT_INFO_1.B in the D01 directory are used. By including the information associated with the D00 directory in the first license information and including the information associated with the D01 directory in the second license information, the license information is uniquely mapped into the directory so that the directory used can be determined by referring to the information included in the license information. Thus, by ensuring that expansion of functions by the second information is greater than expansion of functions by the first license information so as to enable expansion of executable functions in stages, a novel method of distributing game software is achieved.

A case is considered where license information is acquired in order to increase game stages while the game is being run. It will be assumed that the player can proceed up to the third stage without the license information and that the player can proceed up to the tenth stage when the license information is acquired. In this case, the screen that prompts the player to purchase the game software may be displayed on the display when the player has cleared the third stage. This allows the user to acquire the license information that lets the user to play up to the tenth stage by selecting the purchase button. It would be ruthless, however, to have the user starting over at the first stage. In this respect, the application execution unit 124 may save the status information on the game occurring when the third stage is cleared, and, internally, may reset and restart the game program, reflecting the saved data in the fourth stage to make it appear to the user that the game is proceeding continuously.

According to the present invention, a technology is provided capable of effectively presenting the availability of application software to the user and reducing the hassle of running application software for the user.

The invention claimed is:
1. An information processing apparatus comprising:
a storage configured to store at least first content information and second content information for an application program assigned identification information;
a display processing unit configured to read any of the content information for the application program and generate a display screen to display on an output device;
a memory capable of storing license information; and
a determination unit configured to determine whether the license information for the application program is stored in the memory by referring to the identification information;
an application execution unit configured to execute the application program and the application program issuing a request to determine whether the license information is stored in memory each time that the application execution unit executes the application program; and
a processing module configured to automatically determine, without user input of the license information, whether the license information for the application program is stored in the memory in response to the request from the application program each time that the application program is executed by the application execution unit,
wherein the first content information, the second content information, and the application program form application software, wherein the display processing unit generates a display screen using the first content information until the determination unit determines that the license information is stored, and generates a display screen using the second content information instead of the first content information when the determination unit determines that the license information is stored, wherein the processing module communicates a result of determination indicating whether the license information is stored in the memory to the application program, and wherein the application program determines a mode of operation in accordance with the communicated result of determination.

2. The information processing apparatus according to claim 1, further comprising:
an input acknowledging unit configured to acknowledge request information from a user;
a license information acquisition unit configured to acquire the license information for the application program by referring to the request information acknowledged by the input acknowledging unit,
wherein the memory stores the license information acquired by the license information acquisition unit.

3. The information processing apparatus according to claim 2, wherein the license information acquisition unit is configured to acquire license information from a server connected to the license information acquisition unit such that communication is enabled.

4. The information processing apparatus according to claim 1, wherein when the determination unit determines that the license information is stored, the display processing unit generates a display screen using the second content image included in the second content information instead of the first content image included in the first content information.

5. The information processing apparatus according to claim 4, wherein the first content image and the second content image are icon images.

6. The information processing apparatus according to claim 1, wherein the storage is a read-only recording medium configured to store the first content information and the second content information along with the application program.

7. The information processing apparatus according to claim 1, further comprising:
a program acquisition unit configured to download the first content information and the second content information from a server along with the application program,
wherein the storage stores the application program, the first content information and the second content information which are downloaded.

8. The information processing apparatus according to claim 1, wherein the license information permits expansion of executable functions of the application program.

9. The information processing apparatus according to claim 1, wherein the processing module is started in response to a request from the application execution unit.

10. The information processing apparatus according to claim 1, wherein:
the memory stores first parameter information and second parameter information defining configuration information related to the execution of application program, and
the processing module reads from the memory the first parameter information or the second parameter information depending on whether the license information is stored in the memory, thereby establishing an execution environment of the application program.

11. A computer readable, non-transitory recording medium storing a computer program adapted for a computer configured to execute an application program, the computer program comprising:
a module configured to acknowledge request information from a user;
a module configured to read, from a storage configured to store at least first content information and second content information for an application program assigned identification information, any of the content information for the application program and generate a display screen to display on an output device;
a module configured to acquire license information for the application program by referring to request information acknowledged;
a module configured to store the acquired license information in a memory;
a first determination module configured to determine whether the license information for the application program is stored in the memory by referring to the identification information;
a module configured to execute the application program and the application program issuing a request to determine whether the license information is stored in memory each time that the application program is executed; and
a second determination module configured to automatically determine, without user input of the license information, whether the license information for the application program is stored in the memory in response to the request from the application program each time that the application program is executed,
wherein the first content information, the second content information, and the application program form application software,
wherein the module for generating a display screen generates a display screen using the first content information until it is determined by the first determination module that the license information is stored, and generates a display screen using the second content information instead of the first content information when it is determined by the first determination module that the license information is stored, and
wherein, when a result of determination indicating whether the license information is stored is communicated from the second determination module, the application program determines a mode of operation in accordance with the communicated result of determination.

12. A method, comprising:
storing at least first content information and second content information for an application program assigned identification information in an information processing apparatus;
reading any of the content information for the application program and generating a display screen to display on an output device;
storing license information in a memory of the information processing apparatus; and
determining whether the license information for the application program is stored in the memory by referring to the identification information
executing the application program, and the application program issuing a request to determine whether the license information is stored in memory each time that the application program is executed; and
automatically determining, without user input of the license information, whether the license information for the application program is stored in the memory in response to the request from the application program each time that the application program is executed, and communicating a result of the determination to the application program, wherein the first content information, the second content information, and the application program form application software, wherein generating step includes generating a display screen using the first content information until the determination has been made that the license information is stored, and generating a display screen using the second content information instead of the first content information when the determination has been made that the license information is stored, and wherein the application program determines a mode of operation in accordance with the communicated result of the determination.

* * * * *